(12) United States Patent
Rodriguez et al.

(10) Patent No.: US 9,856,344 B2
(45) Date of Patent: Jan. 2, 2018

(54) REDUCTION OF ALDEHYDES IN AMINE CATALYSTS

(71) Applicant: HUNTSMAN PETROCHEMICAL LLC, The Woodlands, TX (US)

(72) Inventors: Frank Rodriguez, Conroe, TX (US); Robert A Grigsby, Jr., Spring, TX (US); Eugene P Wiltz, Jr., The Woodlands, TX (US); Ernest L Rister, Jr., Round Rock, TX (US); Bhajendra N Barman, Katy, TX (US)

(73) Assignee: HUNTSMAN PETROCHEMICAL LLC, The Woodlands, TX (US)

( * ) Notice: Subject to any disclaimer, the term of this patent is extended or adjusted under 35 U.S.C. 154(b) by 0 days.

(21) Appl. No.: 14/767,930

(22) PCT Filed: Aug. 26, 2014

(86) PCT No.: PCT/US2014/052622
§ 371 (c)(1),
(2) Date: Aug. 14, 2015

(87) PCT Pub. No.: WO2015/031305
PCT Pub. Date: Mar. 5, 2015

(65) Prior Publication Data
US 2016/0159966 A1 Jun. 9, 2016

Related U.S. Application Data
(60) Provisional application No. 61/869,829, filed on Aug. 26, 2013.

(51) Int. Cl.
| | | |
|---|---|---|
| *C08G 18/18* | (2006.01) | |
| *C07B 63/04* | (2006.01) | |
| *C08L 75/04* | (2006.01) | |
| *B01J 19/24* | (2006.01) | |
| *B01J 31/02* | (2006.01) | |
| *B01J 31/04* | (2006.01) | |
| *B01J 31/06* | (2006.01) | |
| *B01J 31/08* | (2006.01) | |

(52) U.S. Cl.
CPC ........... *C08G 18/18* (2013.01); *B01J 19/24* (2013.01); *B01J 31/0237* (2013.01); *B01J 31/04* (2013.01); *B01J 31/06* (2013.01); *B01J 31/08* (2013.01); *C08G 18/1833* (2013.01); *C08G 18/1875* (2013.01); *C08L 75/04* (2013.01); *B01J 2219/1923* (2013.01); *B01J 2219/1943* (2013.01); *B01J 2219/1947* (2013.01); *B01J 2219/24* (2013.01)

(58) Field of Classification Search
CPC .......... C08G 18/18; C08G 18/20; B01J 19/24; C08L 75/04

USPC .......................................................... 524/871
See application file for complete search history.

(56) References Cited

U.S. PATENT DOCUMENTS

| | | | | |
|---|---|---|---|---|
| 3,692,705 | A * | 9/1972 | Newey et al. | C08G 59/26 156/330 |
| 3,723,361 | A * | 3/1973 | Newey et al. | C08G 59/3227 528/114 |
| 4,355,742 | A | 10/1982 | Scholle | |
| 4,374,814 | A | 2/1983 | Gaylord | |
| 4,454,945 | A | 6/1984 | Jabarin et al. | |
| 5,081,180 | A * | 1/1992 | Bourguignon | C08G 18/632 521/137 |
| 5,157,100 | A | 10/1992 | Babjak, Jr. et al. | |
| 5,420,170 | A | 5/1995 | Lutter et al. | |
| 5,506,329 | A | 4/1996 | Chou et al. | |
| 5,648,447 | A | 7/1997 | Seneker et al. | |
| 5,686,511 | A * | 11/1997 | Bobo | C09D 163/00 523/412 |
| 6,107,359 | A | 8/2000 | Dietrich et al. | |
| 6,552,100 | B2 | 4/2003 | McLaren et al. | |
| 6,737,471 | B2 | 5/2004 | Lorenz et al. | |
| 6,790,872 | B2 | 9/2004 | Kazmierski et al. | |
| 7,060,759 | B2 | 6/2006 | Brinkman | |
| 7,691,914 | B2 | 4/2010 | Abraham et al. | |
| 7,879,928 | B2 | 2/2011 | Goh et al. | |
| 8,465,840 | B2 | 6/2013 | Fader | |
| 2006/0141236 | A1 | 6/2006 | Nakamura et al. | |
| 2008/0281013 | A1 | 11/2008 | Nakamura et al. | |
| 2009/0227758 | A1* | 9/2009 | Miyazaki | C08G 18/2875 528/61 |
| 2009/0236342 | A1 | 9/2009 | Gefri et al. | |
| 2009/0326089 | A1 | 12/2009 | Haas et al. | |
| 2010/0099785 | A1* | 4/2010 | Rister, Jr. | C08G 18/089 521/128 |
| 2011/0009512 | A1 | 1/2011 | Grigsby, Jr. et al. | |

(Continued)

FOREIGN PATENT DOCUMENTS

| | | |
|---|---|---|
| DE | 102008025005 A | 11/2009 |
| WO | 2006/116456 A | 11/2006 |

(Continued)

OTHER PUBLICATIONS

Mackenzie et al., J. Biol. Chem. 1953, 203, 743-753.*

*Primary Examiner* — Vu A Nguyen
(74) *Attorney, Agent, or Firm* — Huntsman Petrochemical LLC; Lewis Craft

(57) ABSTRACT

The present disclosure provides a method for reducing the aldehyde content in an amine catalyst by treating the amine catalyst with an organic acid. The organic acid-treated amine catalyst may then be used in the production of polyurethane materials which exhibit reduced aldehyde emissions.

12 Claims, No Drawings

(56) References Cited

U.S. PATENT DOCUMENTS

| | | |
|---|---|---|
| 2011/0014480 A1* | 1/2011 | Fader .................... B29C 70/086 |
| | | 428/423.1 |
| 2012/0271026 A1 | 10/2012 | Barman et al. |
| 2013/0085193 A1 | 4/2013 | Burdeniuc et al. |
| 2013/0137787 A1 | 5/2013 | Burdeniuc et al. |
| 2013/0203880 A1 | 8/2013 | George et al. |

FOREIGN PATENT DOCUMENTS

| | | |
|---|---|---|
| WO | 2008/089411 A | 7/2008 |
| WO | 2009/115540 A | 9/2009 |

\* cited by examiner

REDUCTION OF ALDEHYDES IN AMINE CATALYSTS

CROSS-REFERENCE TO RELATED APPLICATIONS

This application is the National Phase of International Application PCT/US2014/052622 filed Aug. 26, 2014 which designated the U.S. and which claims priority to U.S. App. Ser. No. 61/869,829 filed Aug. 26, 2013. The noted applications are incorporated herein by reference.

FIELD OF THE INVENTION

The present disclosure is directed to amine catalysts exhibiting low levels of aldehydes and to polyurethane materials produced using such amine catalysts.

BACKGROUND INFORMATION

Emissions from polyurethane foam are a concern in many applications, especially when workers or end users are exposed to the foam within an enclosed space. Aldehyde emissions, such as formaldehyde, are a particular cause of concern. To reduce such aldehyde emissions, several methods have been developed to reduce the aldehyde content of the raw materials used in producing polyurethane foam. For example: U.S. Pat. No. 7,879,928 discloses a method for preventing the formation of aldehyde compounds in polyether or polyester polyols by incorporating a phenolic antioxidant and an aminic antioxidant into the polyol; U.S. Pat. Publ. No. 2009/0227758 discloses a method of reducing aldehydes in polyols and polyisocyanates by reacting the polyol with an oxazolidine-forming amino alcohol and the polyisocyanate with a nitroalkane; and U.S. Pat. No. 5,506,329 discloses the use of certain aldimine oxazolidine compounds for scavenging formaldehyde from polyisocyanate-containing preparations.

In addition to polyols and polyisocyanates, amine catalysts are often utilized as a raw material in the production of polyurethane foam. The aldehydes found in amine catalysts may be derived from a variety of sources, for example, they may be present as a contaminant from the manufacture of the amine, or they may result from the oxidation or free radical attack of various carbon segments of the amine during storage. Methods to reduce the aldehyde content in amine catalysts include the use of inert gas (see U.S. Pat. Publ. No. 2013/0085193), primary amines (see U.S. Pat. Publ. No. 2011/0009513) free radical scavengers (see U.S. Pat. Publ. No. 2012/0271026) and combining an amine which has urea, amide, secondary-amine, primary amine or secondary-hydroxyl functionality with a carboxylic diacid or triacid (see U.S. Pat. Publ. No. 2013/0137787).

Despite the state of the art, there is a continuing need for developing other inexpensive and effective methods to reduce the aldehyde content in amine catalysts. Preferably, such methods do not result in significant changes in the properties or performance of the amine catalyst or the resulting polyurethane foam. Moreover, preferably such methods do not produce other fugitive species which may bring additional environmental, health and safety issues to the amine catalyst and resulting polyurethane foam.

SUMMARY OF THE INVENTION

The present disclosure relates to a method for reducing the aldehyde impurities from an amine catalyst by treating the amine catalyst with an organic acid and subjecting the mixture to conditions such that the level of aldehyde impurities in the amine catalyst is reduced.

In a further embodiment, the present disclosure provides a method for reducing the aldehyde emissions from a polyurethane material by reacting a polyisocyanate and polyol in the presence of the organic acid-treated amine catalyst above.

In a still further embodiment, the present disclosure provides a packaged product comprising a container and a catalyst mixture within the container, the catalyst mixture comprising an amine catalyst and an organic acid wherein the amine catalyst and organic acid have been subjected to conditions such that the level of aldehyde impurities in the amine catalyst has been reduced.

DETAILED DESCRIPTION

If appearing herein, the term "comprising" and derivatives thereof are not intended to exclude the presence of any additional component, step or procedure, whether or not the same is disclosed herein. In order to avoid any doubt, all formulations claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical object of the article. By way of example, "a nonionic surfactant" means one nonionic surfactant or more than one nonionic surfactant.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

For methods of treating an amine catalyst, the term "treating" includes placing a component onto the tertiary amine using any suitable manner known in the art, including, but not limited to, pumping, injecting, pouring, releasing, displacing, squeezing, spotting, or circulating the component onto the amine catalyst.

In one aspect, the present disclosure provides a method for reducing the aldehyde content in an amine catalyst by mixing an organic acid selected from a polymer acid, a carboxylic monoacid and a mixture thereof with an amine catalyst containing one or more aldehyde impurities to form a catalyst mixture and subjecting the catalyst mixture to conditions such that the level of aldehyde impurities in the amine catalyst are reduced. In another aspect, the present disclosure provides a method for reducing aldehyde emissions from a polyurethane material comprising (i) mixing an organic acid selected from a polymer acid, a carboxylic monoacid and a mixture thereof with an amine catalyst containing one or more aldehyde impurities to form a catalyst mixture and subjecting the catalyst mixture to conditions such that the level of aldehyde impurities in the amine catalyst are reduced and (ii) reacting a polyol with a polyisocyanate in the presence of the catalyst mixture from step (i) to form a polyurethane material. In still another aspect, there is provided a packaged product comprising (i) a container having an outlet and (ii) a catalyst mixture within the container comprising an organic acid selected from a polymer acid, a carboxylic monoacid and a mixture thereof and an amine catalyst containing one or more aldehyde impurities wherein the catalyst mixture is subjected to conditions such that the level of aldehyde impurities in the amine catalyst are reduced. The packaged product may be stored for a long period of time (for e.g. at least about 1 month) and can be used in the manufacture of a polyurethane material. The present disclosure therefore provides an inexpensive and effective way to reduce the level of aldehyde impurities, such as formaldehyde, in an amine catalyst through treatment with at least one of a polymer acid and/or a carboxylic acid. After treatment, the catalyst mixture comprising the amine catalyst and polymer acid and/or carboxylic acid can then be used to catalyze the reaction between a polyol and polyisocyanate to produce a polyurethane material that exhibits reduced aldehyde emissions.

The amine catalyst of the present disclosure may be any amine useful as a catalyst in a polyurethane material formation reaction. According to one embodiment, the amine catalyst is an amine containing one or more tertiary amino groups. Examples include, but are not limited to, bis-(2-dimethylaminoethyl)ether (JEFFCAT® ZF-20 catalyst), N,N,N'-trimethyl-N'-hydroxyethylbisaminoethylether (JEFFCAT® ZF-10 catalyst), N-(3-dimethylaminopropyl)-N, N-diisopropanolamine (JEFFCAT® DPA catalyst), N, N-dimethylethanolamine (JEFFCAT® DMEA catalyst), triethylene diamine (JEFFCAT® TEDA catalyst), blends of N,N-dimethylethanolamine and triethylene diamine (such as JEFFCAT® TD-20 catalyst), N,N-dimethylcyclohexylamine (JEFFCAT® DMCHA catalyst), benzyldimethylamine (JEFFCAT® BDMA catalyst), pentamethyldiethylenetriamine (JEFFCAT® PMDETA catalyst), N,N,N',N",N"-pentamethyldipropylenetriamine (JEFFCAT® ZR-40 catalyst), N,N-bis(3-dimethylaminopropyl)-N-isopropanolamine (JEFFCAT® ZR-50 catalyst), N'-(3-(dimethylamino)propyl-N,N-dimethyl-1,3-propanediamine (JEFFCAT® Z-130 catalyst), 2-(2-dimethylaminoethoxy)ethanol (JEFFCAT® ZR-70 catalyst), N,N,N'-trimethylaminoethyl-ethanolamine (JEFFCAT® Z-110 catalyst), N-ethylmorpholine (JEFFCAT® NEM catalyst), N-methylmorpholine (JEFFCAT® NMM catalyst), 4-methoxyethylmorpholine, N, N'dimethylpiperzine (JEFFCAT® DMP catalyst), 2,2'dimorpholinodiethylether (JEFFCAT® DMDEE catalyst), 1,3,5-tris(3-(dimethylamino)propyl)-hexahydro-s-triazine (JEFFCAT® TR-90 catalyst), 1-Propanamine, 3-(2-(dimethylamino)ethoxy), substituted imidazoles such as 1,2-dimethlyimidazol and 1-methyl-2-hydroxyethylimidazole, N,N'-dimethylpiperazines or bis-substituted piperazines such aminoethylpiperazine, N,N',N'-trimethyl aminoethylpiperazine or bis-(N-methyl piperazine)urea, N-methylpyrrolidines and substituted methylpyrrolidines such as 2-aminoethyl-N-methylpyrrolidine or bis-(N-methylpyrrolidine) ethyl urea, 3-dimethylaminopropylamine, N,N,N",N"-tetramethyldipropylenetriamine, tetramethylguanidine, 1,2 bis-diisopropanol. Other examples of amine catalysts include N-alkylmorpholines such as N-methylmorpholine, N-ethylmorpholine, N-butylmorpholine and dimorpholinodiethylether, N,N'-dimethylaminoethanol, N, N-dimethyl amino ethoxyethanol, bis-(dimethylaminopropyl)-amino-2-propanol, bis-(dimethylamino)-2-propanol, bis-(N,N-dimethylamino)ethylether; N,N,N'-trimethyl-N'hydroxyethyl-bis-(aminoethyl)ether, N,N-dimethylaminoethyl-N'-methyl amino ethanol, tetramethyliminobispropylamine and combinations thereof. The aforementioned JEFFCAT® catalysts are available from Huntsman Petrochemical LLC, The Woodlands, and Texas.

The "polymer acid" used herein to treat the amine catalyst is defined in two ways. First, the "polymer acid" is any material containing three or more of the same repeating monomers of either an unsaturated carboxylic acid or an anhydride. Second, the "polymer acid" is any material containing at least two repeating monomers, wherein the first monomer is either an unsaturated carboxylic acid or an anhydride, and the second monomer is different from the first monomer. Thus, in an embodiment where the first monomer is an unsaturated carboxylic acid, the second monomer may be a different unsaturated carboxylic acid, an anhydride, or an alternative monomer. Alternatively, in an embodiment where the first monomer is an anhydride, the second monomer may be an unsaturated carboxylic acid, a different anhydride or an alternative monomer. In one embodiment, the alternative monomer to the unsaturated carboxylic acid and anhydride is a vinyl monomer, such as, but not limited to, styrene, ethylene, propylene, butylene, acrylonitrile, and vinyl chloride.

The unsaturated carboxylic acid and anhydride of the polymer acid may be any acid containing at least one double bond, and which is capable of being polymerized with either itself or another acid or anhydride monomer, or any non-acid containing monomer. Examples of unsaturated carboxylic acids and anhydrides include, but are not limited to, acrylic acid, methacrylic acid, maleic acid, maleic anhydride, succinic acid, succinic anhydride, furoic acid, fumaric acid, sorbic acid, tiglic acid, linoleic acid, linolenic acid, licanic acid, and other acids containing double bonds which are capable of reacting with ethylenic unsaturated monomers or dimers.

In one embodiment, the polymer acid contains at least three or more of the same repeating monomers selected from the group consisting of acrylic acid, methacrylic acid, maleic acid, maleic anhydride, furoic acid, fumaric acid, sorbic acid, tiglic acid, linoleic acid, linolenic aid and licanic acid.

In another embodiment, the polymer acid contains at least two repeating monomers where the first monomer is an unsaturated carboxylic acid and the second monomer is a different unsaturated carboxylic acid, an anhydride or an alternative monomer. In one particular embodiment, the unsaturated carboxylic acid may be selected from the group consisting of acrylic acid, methacrylic acid, maleic acid, furoic acid, fumaric acid, sorbic acid, tiglic acid, linoleic acid, linolenic aid and licanic acid. In yet another embodiment, the anhydride and the alternative monomer when present may be selected from the group consisting of maleic anhydride, styrene, ethylene, propylene, butylene, acrylonitrile and vinyl chloride.

In still another embodiment, the polymer acid contains at least two repeating monomers where the first monomer is an anhydride and the second monomer is a different anhydride, an unsaturated carboxylic acid or an alternative monomer. In one particular embodiment, the anhydride may be maleic anhydride. In another embodiment, the unsaturated carboxylic acid or alternative monomer when present may be selected from the group consisting of acrylic acid, methacrylic acid, maleic acid, furoic acid, fumaric acid, sorbic acid, tiglic acid, linoleic acid, linolenic aid, licanic acid, styrene, ethylene, propylene, butylene, acrylonitrile and vinyl chloride.

The carboxylic monoacid used herein to treat the amine catalyst can be any carboxylic acid containing one —COOH group. In some embodiments, the carboxylic monoacid contains a linear or branched chain. In other embodiments, the carboxylic monoacid is saturated or unsaturated. Thus, in one embodiment, the carboxylic monoacid is represented by the formula R—COOH where R is a saturated or unsaturated $C_1$ to $C_{40}$ hydrocarbon chain. In still another embodiment, R is a saturated $C_1$ to $C_{22}$ hydrocarbon chain. In one particular embodiment, the carboxylic monoacid is selected from 2-ethylhexanoic acid, formic acid and lactic acid.

In some embodiments, the catalyst mixture of the amine catalyst and the organic acid selected from a polymer acid, carboxylic acid and mixture thereof is solid. Therefore a solvent may also be added when forming the catalyst mixture. The solvent is not limited and may include water, high molecular weight polyols, butanediol, alcohols, such as lower carbon chain alcohols, for example, isopropyl alcohol, ethanol, n-propyl alcohol, n-butyl alcohol, sec-butyl alcohol, n-amyl alcohol, sec-amyl alcohol, n-hexyl alcohol, and sec-hexyl alcohol; lower carbon chain alcohols that have been alkoxylated with ethylene oxide (EO), propylene oxide (PO) or butylene oxide (BO), for example, n-butanol+1EO, n-butanol+2EO, n-butanol+3EO, n-hexanol+6EO, 2-ethylhexanol+2EO and iso-butanol+3EO, alcohol ethers, polyalkylene alcohol ethers, such as ethylene glycol monobutyl ether, polyalkylene glycols, such as ethylene glycol and propylene glycol, poly(oxyalkylene) glycols, such as diethylene glycol, poly(oxyalkylene) glycol ethers, or any mixtures thereof. In one embodiment, the amount of solvent added may be an amount necessary to give a solids weight ratio of about 5-95% by weight. In another embodiment, the amount of solvent added may be an amount to give a solids weight ratio of about 10-80% by weight.

In one embodiment, the amine catalyst is treated by mixing it with the organic acid and optional solvent to form a catalyst mixture and then subjecting the catalyst mixture to conditions such that the level of aldehyde impurities in the catalyst mixture is reduced. According to one embodiment, such conditions include maintaining the catalyst mixture at approximately room temperature for at least about 6 hours. In another embodiment, such conditions include maintaining the catalyst mixture at approximately room temperature for at least about 12 hours, while in another embodiment such conditions include maintaining the catalyst mixture at approximately room temperature for at least about 24 hours. In other embodiments, a higher temperature may also be used to accelerate the removal of aldehydes from the catalyst mixture. Any temperature up to a temperature at which the amine catalyst degrades may be used. In one particular embodiment, a temperature of between about 25°-75° C. is used; in another embodiment, a temperature of between about 50°-70° C. is used; while in another embodiment a temperature of about 55°-65° C. is used; while in still another embodiment, a temperature of about 60° C. may be used. In further embodiments, the catalyst mixture may be maintained at atmospheric pressure or at a pressure up to about 50 kPa, while in still further embodiments the catalyst mixture may be maintained at atmospheric pressure or at a pressure up to about 100 kPa.

In some embodiments, it's generally sufficient to treat the amine catalyst with about 0.5%-45% by weight organic acid based on the total weight of the catalyst mixture. In another embodiment, the amine catalyst may be treated with about 1%-40% by weight organic acid based on the total weight of catalyst mixture. In yet another embodiment, the amine catalyst is treated with about 7.5%-35% by weight organic acid up based on the total weight of catalyst mixture. In still another embodiment, the amine catalyst is treated with up to about 40% by weight, preferably up to about 35% by weight organic acid, based on the total weight of the catalyst mixture. In a further embodiment, the amine catalyst is treated with at least about 1% by weight, preferably at least about 7.5% by weight organic acid, based on the total weight of the catalyst mixture.

In still another embodiment, a formulation containing the amine catalyst together with other components useful in a polyurethane material formation reaction, for example, a polyol, a polyisocyanate, a surfactant, a blowing agent and/or other additives such as a cell stabilizer, crosslinking agent, chain extender, pigment, filler, flame retardant, mold release agent, plasticizers; acid scavenger; water scavenger; cell regulator; dye; UV stabilizer; fungistatic or bacteriostatic substance and transition metal catalyst may be treated with the organic acid and subjected to the conditions similar to those described above such that the level of aldehyde impurities in the formulation are reduced. Thus, in one embodiment, the amine catalyst and other components useful in a polyurethane formation reaction are mixed with an organic acid to form a formulation and then stored at room temperature or at a higher temperature of up to about 70° C. for at least about 6 hours, preferably at least about 12 hours, and more preferably at least 24 hours.

Once the level of aldehyde impurities in the catalyst mixture or formulation described above have been reduced, the catalyst mixture or formulation may be used to make a polyurethane material that exhibits reduced aldehyde emissions compared to a polyurethane material that has been made from a catalyst mixture or formulation that has not been treated in accordance with this disclosure. The catalyst mixture or formulation can be used to make polyurethane materials in the same manner as untreated materials. These methods are well known to those skilled in the art and can be found in, for example, U.S. Pat. Nos. 5,420,170, 5,648, 447, 6,107,359, 6,552,100, 6,737,471 and 6,790,872, the contents of which are hereby incorporated by reference. Various types of polyurethane materials can be made such as rigid foams, flexible foams, semi-flexible foams, microcellular elastomers, backings for textiles, spray elastomers, cast elastomers, polyurethane-isocyanurate foams, reaction injection molded polymers, structural reaction injection molded polymers and the like.

According to one embodiment, particular foam applications include foams for cushioning applications such as bedding and seating and foams for automotive interiors such as flexible and semi-flexible foams for automotive seating, in headrests, in dashboards and instrument panels, in armrests or in headliners.

In one particular embodiment, a polyurethane foam may be prepared by bringing together at least one polyol and at least one polyisocyanate in the presence of the catalyst mixture to form a reaction mixture and subjecting the reaction mixture to conditions sufficient to cause the polyol to react with the polyisocyanate. The polyol, polyisocyanate and catalyst mixture may be heated prior to mixing them to form the reaction mixture. In other embodiments, the polyol, polyisocyanate and catalyst mixture are mixed at ambient temperature (for e.g. from about 15°-40° C.). Heat may be applied to the reaction mixture, but in most embodiments, this is not necessary. The polyurethane foam may be made in a free rise (slabstock) process in which the foam is free to rise under minimal or no vertical constraints. Alternatively, molded foam may be made by introducing the reaction mixture in a closed mold and allowing it to foam within the mold. The particular polyol and polyisocyanate are selected with the desired characteristics of the resulting foam. Other components useful in making polyurethanes, such as those described above, may also be included to produce a particular type of foam.

According to one embodiment, the polyurethane material may be produced from the reaction of an A-side reactant with a B-side reactant. The A-side reactant may comprise a polyisocyanate while the B-side reactant may comprise a polyol and the catalyst mixture according to the present disclosure. In some embodiments, the A-side and/or B-side may also contain optional other components such as those described above.

The polyisocyanates suitable for use include unmodified polyisocyanates, modified polyisocyanates and isocyanate prepolymers. Such polyisocyanates include those represented by the formula Q(NCO)n where n is a number from 2-5, preferably 2-3 and Q is an aliphatic hydrocarbon group containing 2-18 carbon atoms, a cycloaliphatic hydrocarbon group containing 5-10 carbon atoms, an araliphatic hydrocarbon group containing 8-13 carbon atoms, or an aromatic hydrocarbon group containing 6-15 carbon atoms.

Examples of suitable polyisocyanates include, but are not limited to, ethylene diisocyanate; 1,4-tetramethylene diisocyanate; 1,6-hexamethylene diisocyanate; 1,12-dodecane diisocyanate; cyclobutane-1,3-diisocyanate; cyclohexane-1, 3- and -1,4-diisocyanate, and mixtures of these isomers; isophorone diisocyanate; 2,4- and 2,6-hexahydrotoluene diisocyanate and mixtures of these isomers; dicyclohexylmethane-4,4'-diisocyanate (hydrogenated MDI, or HMDI); 1,3- and 1,4-phenylene diisocyanate; 2,4- and 2,6-toluene diisocyanate and mixtures of these isomers (TDI); diphenylmethane-2,4'- and/or -4,4'-diisocyanate (MDI); naphthylene-1,5-diisocyanate; triphenylmethane-4,4',4''-triisocyanate; polyphenyl-polymethylene-polyisocyanates of the type which may be obtained by condensing aniline with formaldehyde, followed by phosgenation (crude MDI); norbornane diisocyanates; m- and p-isocyanatophenyl sulfonylisocyanates; perchlorinated aryl polyisocyanates; modified polyisocyanates containing carbodiimide groups, urethane groups, allophanate groups, isocyanurate groups, urea groups, or biruret groups; polyisocyanates obtained by telomerization reactions; polyisocyanates containing ester groups; and polyisocyanates containing polymeric fatty acid groups. Those skilled in the art will recognize that it is also possible to use mixtures of the polyisocyanates described above.

Isocyanate-terminated prepolymers may also be employed in the preparation of the polyurethane materials. Isocyanate prepolymers may be prepared by reacting an excess of polyisocyanate or mixture thereof with a minor amount of an active-hydrogen containing compound as determined by the well-known Zerewitinoff test as described by Kohler in "Journal of the American Chemical Society," 49, 3181 (1927).

The polyol may be a petroleum-derived polyol, a natural oil polyol or a polyol obtained from renewable natural resources such as vegetable oil.

Petroleum-derived polyols useful in producing a polyurethane material according to the present disclosure include polyether polyol, polymer polyols, and polyester polyols having 2 or more reactive hydroxyl groups. Polyether polyols include, for example, polyhydric alcohols such as glycol, glycerin, pentaerythritol, and sucrose; aliphatic amine compounds such as ammonia, and ethyleneamine; aromatic amine compounds such as toluene diamine, and diphenylmethane-4,4'-diamine; and/or a polyether polyol obtained by adding ethylene oxide or propylene oxide to a mixture of above-mentioned compounds. A polymer polyol is exemplified by a reaction product of a polyether polyol with ethylenic unsaturated monomer, such as butadiene, acrylonitrile, and styrene, the reaction being conducted in the presence of a radical polymerization catalyst. Polyester polyols include those which are produced from a dibasic acid and a polyhydric alcohol such as, for example, polyethyleneadipate and polyethyleneterephthalates which may include those products reclaimed from waste materials.

Polyols from inexpensive and renewable resources may also be used and are highly desirable since they minimize the depletion of fossil fuel and other non-sustainable resources. Natural oils consist of triglycerides of saturated and unsaturated fatty acids. One natural oil polyol is castor oil, a natural triglyceride of ricinoleic acid. Other natural oils need to be chemically modified to introduce sufficient hydroxyl content to make them useful in the production of polyurethane materials. There are two chemically reactive sites that can be considered when attempting to modify natural oil into a useful polyol: 1) the unsaturated sites (double bonds); and 2) the ester functionality. Unsaturated sites present in natural oil can be hydroxylated via epoxidation, followed by ring opening or hydroformylation, followed by hydrogenation. Alternatively, trans-esterification can also be utilized to introduce OH groups in natural oil. The chemical process for the preparation of natural polyols using an epoxidation route involves a reaction mixture that requires epoxidized natural oil, a ring opening acid catalyst and a ring opener. Epoxidized natural oils include epoxidized plant-based oils (epoxidized vegetable oils) and epoxidized animal fats. The epoxidized natural oils may be fully or partially epoxidized and these oils include soybean oil, corn oil, sunflower oil, olive oil, canola oil, sesame oil, palm oil, rapeseed oil, tung oil, cotton seed oil, safflower oil, peanut oil, linseed oil and combinations thereof. Animal fats include fish, tallow and lard. These natural oils are triglycerides of fatty acids which may be saturated or unsaturated with various chain lengths from $C_{12}$ to $C_{24}$. These acids can be: 1) saturated: lauric, myristic, palmitic, steric, arachidic and lignoceric; 2) mono-unsaturated: palmitoleic, oleic, 3) poly-unsaturated: linoleic, linolenic, arachidonic. Partially or fully epoxidized natural oil may be prepared when reacting peroxyacid under suitable reaction conditions. Examples of peroxyacids utilized in the epoxidation of oils have been described in WO 2006/116456 A1; hereby incorporated by reference. Ring opening of the epoxidized oils with alcohols, water and other compounds having one or multiple nucleophilic groups can be used. Depending on the reaction conditions, oligomerization of the epoxidized oil can also occur. Ring opening yields a natural oil polyol that can then be used in the manufacture of polyurethane materials. In the hydroformylation/hydrogenation process, the oil is hydroformylated in a reactor filled with a hydrogen/carbon monoxide mixture in the presence of a suitable catalyst (typically cobalt or rhodium) to form an aldehyde which is hydrogenated in the presence of cobalt or nickel catalyst to form a polyol. Alternatively, polyol from natural oil can be produced by trans-esterification with a suitable poly-hydroxyl containing substance using an alkali metal or alkali earth metal base or salt as a trans-esterification catalyst. Any natural oil or alternatively any partially hydrogenated oil can be used in the transesterification process. Examples of oils include, but are not limited to, soybean, corn, cottonseed, peanut, castor, sunflower, canola, rapeseed, safflower, fish, seal, palm, tung, olive oil or any blend thereof. Any multifunctional hydroxyl compound can also be used such as lactose, maltose, raffinose, sucrose, sorbitol, xylitol, erythritol, mannitol, or any combination.

In one particular embodiment, in addition to the polyol component and catalyst mixture, the B-side reactant optionally comprises one or more additives including, but not limited to: blowing agents; crosslinking agents, flame retardants; plasticizers; internal mold release agents; surfactants; acid scavengers; water scavengers; cell regulators; pigments; dyes; UV stabilizers; fungistatic or bacteriostatic substances; fillers and mixtures thereof.

Examples of blowing agents include, but are not limited to, water, a hydrofluorocarbon, cyclopentane, methyl isobutyl ketone, a hydrocarbon, methylene chloride or mixtures thereof.

Examples of crosslinking agents include, but are not limited to, ethylene glycol, diethylene glycol, triethylene glycol, propylene glycol, 1,3-propanediol, 1,4-butandiol, 1,6-hexanediol, glycerol, and trimethylolpropane.

Examples of flame retardants (which, as the term is used herein, also include smoke suppressants and other known combustion modifiers), include phosphonates, phosphites, and phosphates (such as dimethyl methylphosphonate, ammonium polyphosphate, and various cyclic phosphate and phosphonate esters known in the art); halogen-containing compounds known in the art (such as brominated diphenyl ether and other brominated aromatic compounds); melamine; antimony oxides (such as antimony pentoxide and antimony trioxide); zinc compounds (such as various known zinc borates); aluminum compounds (such as alumina trihydrate); and magnesium compounds (such as magnesium hydroxide).

Internal mold release agents are compounds that may be added to assist in the removal of the polyurethane material from a mold. Suitable internal mold release agents include those based at least in part on fatty acid esters, metal and/or amine salts of carboxylic acids, amido carboxylic acids, phosphorus-containing acids, boron-containing acids, amidines, and neutralized esters prepared from certain amine-started tetrahydroxy compounds as described in U.S. Pat. No. 5,208,268. Also suitable are water based and solvent based mold release agents, such as those containing naphthalene and paraffin wax.

Surfactants (or surface-active agents) include emulsifiers and foam stabilizers, such as silicone surfactants known in the art, for example, polysiloxanes, as well as various amine salts of fatty acids, such as diethylamine oleate or diethanolamine stearate, as well as sodium salts of ricinoleic acids.

Acid scavengers are compounds that may be added to control the acidity and water concentration. Preferred acid scavengers include various orthoesters, such as trimethyl orthoformate, carbodiimides, such as 2,2',6,6'-tetraisopropyldiphenylcarbodiimide, and epoxides, such as 3,4-epoxycyclohexylmethyl 3,4-epoxy-cyclohexylcarboxylate.

Water scavengers (or moisture scavengers) are compounds that may be added to maintain a low water content in the compositions of the present invention. Suitable water scavengers include alkali aluminosilicates.

Fillers and/or reinforcing substances, include barium sulfate, calcium carbonate, calcium silicate, clays, fly ash, kieselguhr, whiting, mica, glass fibers, liquid crystal fibers, glass flakes, glass balls, microspheres, aramide fibers, and carbon fibers.

According to one embodiment, the polyurethane material may be prepared in a one-step process in which an A-side reactant is combined with a B-side reactant. The A-side may include the polyisocyanate or mixture of polyisocyanates. Different polyisocyanates may be selected to create different properties in the final product. The B-side may be a solution including at least one polyol and the catalyst mixture of the present disclosure and optionally additives.

The polyurethane materials produced having reduced aldehyde emissions may be used in a variety of applications, such as, a precoat; a backing material for carpet; building composites; insulation; spray foam insulation; applications requiring use of impingement mix spray guns; urethane/urea hybrid elastomers; vehicle interior and exterior parts such as bed liners, dashboards, door panels, and steering wheels; flexible foams (such as furniture foams and vehicle component foams); integral skin foams; rigid spray foams; rigid pour-in-place foams; coatings; adhesives; sealants; filament winding; and other polyurethane composite, foams, elastomers, resins, and reaction injection molding (RIM) applications.

In another embodiment, there is provided a packaged product comprising: a) a container having at least an outlet; and b) the catalyst mixture of the present disclosure within the container. In one embodiment, the catalyst mixture will have been stored at room temperature within the container for at least 6 hours, in other embodiments at least 12 hours, while in still other embodiments at least about 24 hours. In another embodiment, the catalyst mixture will have been stored within the container at a temperature between 50°-70° C. for at least 6 hours, or for at least about 12 hours or for at least about 24 hours.

According to one embodiment, the packaged product of the present disclosure comprises a container having a closure means, such as a lid, cover, cap, or plug to seal the container. In another embodiment, the sealed container also has a nozzle or pour spout. The sealed container may have the shape of a cylinder, oval, round, rectangle, canister, tub, square or jug and contains the catalyst mixture. In some embodiments, the sealed container is padded with an inert gas, such as nitrogen.

The container may be made from any material, such as steel, glass, aluminium, cardboard, tin-plate, plastics including HDPE, PP, PVC, PET, OPP, PE or polyamide and including mixtures, laminates or other combinations of these. The catalyst mixture is dispensed from the container from the outlet. In once embodiment, the catalyst mixture is dispensed from a nozzle when activated. In another embodiment, the catalyst is mixture is dispensed via a pour spout.

As described below, aldehydes, such as formaldehyde, can be reduced in amine catalysts with no processing requirements other than by mixing the amine catalyst with an organic acid and subjecting the mixture to normal storage conditions or slightly elevated temperature conditions for a minimal amount of time.

EXAMPLES

A commercially available amine catalyst and several catalyst mixtures formulated with the commercially available amine catalyst and different organic acids having varying acid contents were tested. The amine catalysts and catalyst mixtures were subjected to oxidative degradation at room temperature and at an elevated temperature to expedite the degradation process. Aldehyde, specifically formaldehyde, acetaldehyde and propionaldehyde, formation was tracked in the catalyst samples over a period of time. Generally, 100 mL sample of the amine catalyst or catalyst mixture according to the present disclosure was transferred into a 4 oz. bottle. A set of two identical samples were incubated at room temperature and at 60° C. Periodically, a portion of each sample was withdrawn to determine the concentrations of aldehydes formed in that sample.

The aldehyde concentrations were determined by high performance liquid chromatography using a UV detector at 365 nm to determine aldehydes as their 2,4-dinitrophenyl-hydrazine derivatives. For this, a 2% catalyst sample was prepared with water where 2N hydrochloric acid was added to decrease the solution pH to less than 3. 200 μL of this solution was then transferred to a 1.5 mL chromatography sample vial. 1000 μL of 0.06% 2,4-dinitrophenyl hydrazine solution in acetonitrile was then added to the vial. The vial was capped and shaken well before it was placed in a 40° C. heater block for 20 minutes. The following data is presented in parts per million (ppm).

Example 1: JEFFCAT® ZF-10 Amine Catalyst Aldehyde Data (Control)

| JEFFCAT® ZF-10 | Day 0 | Day 1 | Day 2 | Day 3 | Week 1 | Week 2 | Month 1 | Month 3 |
|---|---|---|---|---|---|---|---|---|
| Formaldehyde | 347.7 | 353.4 | 399.9 | 410.3 | 407.2 | 491.1 | 619.5 | 930.3 |
| Acetaldehyde | 94.9 | 93.9 | 94.9 | 93.6 | 90.2 | 93.8 | 88.8 | 167.8 |
| Propionaldehyde | 0.8 | 0.8 | 1.8 | 0.8 | 0.6 | 1.0 | 0.6 | ND* |

ND = not detected

Example 2: Catalyst Mixture (ZF-10 Amine Catalyst+1.00% Acid Level of Polymer Acid) Aldehyde Data

| | Day 0 | Day 1 | Day 2 | Day 3 | Week 1 | Week 2 | Month 1 | Month 3 |
|---|---|---|---|---|---|---|---|---|
| Room Temperature | | | | | | | | |
| Formaldehyde | 287.2 | 276.0 | 268.8 | 269.7 | 255.4 | 244.8 | 222.5 | 229.3 |
| Acetaldehyde | 68.5 | 65.7 | 62.3 | 63.0 | 62.1 | 58.4 | 49.9 | 40.7 |
| Propionaldehyde | 0.5 | ND | 0.3 | 0.2 | 0.1 | 0.1 | ND | ND |
| Stored @ 60° C. | | | | | | | | |
| Formaldehyde | 284.7 | 163.0 | 150.3 | 140.1 | 131.7 | 128.7 | 131.1 | 277.0 |
| Acetaldehyde | 67.9 | 45.8 | 39.8 | 36.8 | 30.6 | 30.7 | 25.4 | 5.1 |
| Propionaldehyde | 0.4 | ND | ND | ND | ND | ND | ND | ND |

Example 3: Catalyst Mixture (ZF-10 Amine Catalyst+8.55% Acid Level of Polymer Acid) Aldehyde Data

| | Day 0 | Day 1 | Day 2 | Day 3 | Week 1 | Week 2 | Month 1 | Month 3 |
|---|---|---|---|---|---|---|---|---|
| Room Temperature | | | | | | | | |
| Formaldehyde | 218.5 | 204.2 | 183.6 | 181.7 | 161.6 | 141.5 | 121.5 | 119.5 |
| Acetaldehyde | 52.6 | 47.4 | 44.1 | 43.8 | 41.3 | 38.5 | 32.3 | 24.6 |
| Propionaldehyde | ND | ND | ND | ND | ND | ND | ND | ND |
| Stored @ 60° C. | | | | | | | | |
| Formaldehyde | 223.9 | 68.5 | 63.1 | 62.6 | 61.4 | 44.3 | 47.8 | 154.1 |
| Acetaldehyde | 48.2 | 26.1 | 25.3 | 24.6 | 19.2 | 13.3 | 6.5 | 8.1 |
| Propionaldehyde | ND | ND | ND | ND | ND | ND | ND | ND |

Example 4: Catalyst Mixture (ZF-10 Amine Catalyst+17.1% Acid Level of Polymer Acid) Aldehyde Data

|  | Day 0 | Day 1 | Day 2 | Day 3 | Week 1 | Week 2 | Month 1 | Month 3 |
|---|---|---|---|---|---|---|---|---|
| Room Temperature | | | | | | | | |
| Formaldehyde | 203.3 | 167.8 | 139.6 | 138.4 | 111.4 | 85.4 | 68.9 | 61.8 |
| Acetaldehyde | 42.9 | 37.7 | 31.5 | 34.9 | 31.3 | 26.8 | 26.3 | 21.5 |
| Propionaldehyde | ND | ND | ND | ND | ND | ND | ND | ND |
| Stored @ 60° C. | | | | | | | | |
| Formaldehyde | 200.3 | 40.6 | 34.9 | 32.0 | 25.1 | 24.1 | 18.5 | 21.4 |
| Acetaldehyde | 43.5 | 22.6 | 18.1 | 15.8 | 10.0 | 3.6 | 1.4 | 7.9 |
| Propionaldehyde | ND | ND | ND | ND | ND | ND | ND | ND |

Example 5: Catalyst Mixture (ZF-10 Amine Catalyst+27.2% Acid Level of 2-Ethylhexanoic Acid) Aldehyde Data

|  | Day 0 | Day 1 | Day 2 | Day 3 | Week 1 | Week 2 |
|---|---|---|---|---|---|---|
| Room Temperature | | | | | | |
| Formaldehyde | 132.6 | 87.0 | 83.1 | 77.7 | 62.7 | 61.1 |
| Acetaldehyde | 14.1 | 14.5 | 11.8 | 16.5 | 14.5 | 15.4 |
| Propionaldehyde | ND | ND | ND | ND | ND | ND |
| Stored @ 60° C. | | | | | | |
| Formaldehyde | 128.8 | 28.3 | 20.7 | 17.1 | 12.8 | 16.4 |
| Acetaldehyde | 15.1 | 9.2 | 10.8 | 7.1 | 3.7 | 3.4 |
| Propionaldehyde | ND | ND | ND | ND | ND | ND |

Example 6: Catalyst Mixture (ZF-10 Amine Catalyst+20.2% Acid Level of Lactic Acid) Aldehyde Data

|  | Day 0 | Day 1 | Day 2 | Day 3 | Week 1 | Week 2 |
|---|---|---|---|---|---|---|
| Room Temperature | | | | | | |
| Formaldehyde | 114.6 | 73.3 | 74.5 | 71.3 | 57.4 | 59.7 |
| Acetaldehyde | 19.4 | 18.9 | 2.5 | 18.5 | 16.9 | 20.9 |
| Propionaldehyde | ND | ND | ND | ND | ND | ND |
| Stored @ 60° C. | | | | | | |
| Formaldehyde | 115.9 | 17.7 | 11.8 | 9.8 | 10.1 | 12.3 |
| Acetaldehyde | 18.6 | 15.4 | 14.7 | 11.8 | 7.6 | 7.1 |
| Propionaldehyde | ND | ND | ND | ND | ND | ND |

Example 7: Catalyst Mixture (ZF-10 Amine Catalyst+11.9% Acid Level of Formic Acid) Aldehyde Data

|  | Day 0 | Day 1 | Day 2 | Day 3 | Week 1 | Week 2 |
|---|---|---|---|---|---|---|
| Room Temperature | | | | | | |
| Formaldehyde | 127.0 | 80.8 | 79.8 | 79.4 | 66.4 | 60.3 |
| Acetaldehyde | 17.1 | 15.8 | 18.3 | 18.9 | 16.2 | 17.3 |
| Propionaldehyde | ND | ND | ND | ND | ND | ND |
| Stored @ 60° C. | | | | | | |
| Formaldehyde | 129.9 | 24.1 | 17.2 | 13.9 | 3.9 | 14.7 |
| Acetaldehyde | 17.2 | 13.5 | 12.4 | 8.2 | 4.5 | 3.6 |
| Propionaldehyde | ND | ND | ND | ND | ND | ND |

Example 8: Catalyst Mixture (ZF-10 Amine Catalyst+32.6% Acid Level of Polymer Acid) Aldehyde Data

|  | Day 0 | Day 1 | Day 2 | Day 3 | Week 1 | Week 2 |
|---|---|---|---|---|---|---|
| Room Temperature | | | | | | |
| Formaldehyde | 121.4 | 83.4 | 77.3 | 76.9 | 66.5 | 66.4 |
| Acetaldehyde | 50.2 | 52.4 | 50.4 | 53.7 | 53.5 | 51.3 |
| Propionaldehyde | ND | ND | ND | ND | ND | ND |
| Stored @ 60° C. | | | | | | |
| Formaldehyde | 122.6 | 30.3 | 34.4 | 3.8 | 49.7 | 44.1 |
| Acetaldehyde | 46.1 | 42.7 | 43.6 | 42.7 | 41.8 | 38.0 |
| Propionaldehyde | ND | ND | ND | ND | ND | ND |

As shown above, over time, JEFFCAT® ZF-10 catalyst can produce formaldehyde, acetaldehyde and propionaldehyde during storage. Incorporating any of the organic acids according to the present disclosure with JEFFCAT® ZF-10 catalyst can reduce the formaldehyde, acetaldehyde and propionaldehyde content over time at both room temperature and at 60° C.

Consideration must be given to the fact that although this disclosure has been described and disclosed in relation to certain preferred embodiments, obvious equivalent modifications and alterations thereof will become apparent to one of ordinary skill in this art upon reading and understanding this specification and the claims appended hereto. The present disclosure includes the subject matter defined by any combination of any one of the various claims appended hereto with any one or more of the remaining claims, including the incorporation of the features and/or limitations of any dependent claim, singly or in combination with features and/or limitations of any one or more of the other dependent claims, with features and/or limitations of any one or more of the independent claims, with the remaining dependent claims in their original text being read and applied to any independent claim so modified. This also includes combination of the features and/or limitations of one or more of the independent claims with the features and/or limitations of another independent claim to arrive at a modified independent claim, with the remaining dependent claims in their original text being read and applied to any independent claim so modified. Accordingly, the presently disclosed invention is intended to cover all such modifications and alterations, and is limited only by the scope of the claims which follow, in view of the foregoing and other contents of this specification.

What is claimed is:

1. A method for reducing the aldehyde content in an amine catalyst comprising (i) mixing an organic acid selected from a polymer acid, a carboxylic monoacid, and a mixture thereof with an amine catalyst containing one or more aldehyde impurities to form a catalyst mixture and (ii) subjecting the catalyst mixture to a temperature in a range of from 40° C. to 75° C. for at least 6 hours such that the level of aldehyde impurities in the catalyst mixture are reduced.

2. The method of claim 1 wherein the catalyst mixture is subjected to a temperature in a range of from 40° C. to 75° C. for at least 24 hours.

3. The method of claim 1 wherein the organic acid is a polymer acid containing at least three or more of the same repeating monomers selected from the group consisting of acrylic acid, methacrylic acid, maleic acid, maleic anhydride, furoic acid, fumaric acid, sorbic acid, tiglic acid, linoleic acid, linolenic acid and licanic acid.

4. The method of claim 1 wherein the organic acid is a polymer acid containing at least two repeating monomers wherein the first monomer is an unsaturated carboxylic acid and the second monomer is a different unsaturated carboxylic acid, an anhydride or other monomer.

5. The method of claim 4 wherein the unsaturated carboxylic acid is selected from the group consisting of acrylic acid, methacrylic acid, maleic acid, furoic acid, fumaric acid, sorbic acid, tiglic acid, linoleic acid, linolenic acid and licanic acid.

6. The method of claim 1 wherein the organic acid is a polymer acid containing at least two repeating monomers wherein the first monomer is an anhydride and the second monomer is a unsaturated carboxylic acid or other monomer.

7. The method of claim 6 wherein the anhydride is maleic anhydride.

8. The method of claim 1 wherein the organic acid is a carboxylic monoacid represented by the formula R—COOH where R is hydrogen or a saturated or unsaturated C1 to C40 hydrocarbon chain.

9. The method of claim 8 wherein the carboxylic monoacid is selected from 2-ethylhexanoic acid, formic acid and lactic acid.

10. A method for reducing aldehyde emissions from a polyurethane material comprising (i) mixing an organic acid selected from a polymer acid, a carboxylic monoacid and a mixture thereof with an amine catalyst containing one or more aldehyde impurities to form a catalyst mixture and subjecting the catalyst mixture to conditions such that the level of aldehyde impurities in the catalyst mixture are reduced and (ii) reacting a polyol with a polyisocyanate in the presence of the catalyst mixture from step (i) to form a polyurethane material.

11. The method of claim 10 wherein the polyol and polyisocyanate are reacted in the presence of one or more additives.

12. The method of claim 11 wherein the one or more additives are selected from a blowing agent; a crosslinking agent, a flame retardant; a plasticizer; an internal mold release agent; a surfactant; an acid scavenger; a water scavenger; a cell regulator; a pigment; a dye; a UV stabilizer; a fungistatic or bacteriostatic substance; a filler; and a mixture thereof.

* * * * *